(12) United States Patent
Yu et al.

(10) Patent No.: US 8,156,330 B2
(45) Date of Patent: Apr. 10, 2012

(54) TERMINAL FOR EXCHANGING ELECTRONIC BUSINESS CARDS

(75) Inventors: Christopher C. Yu, Irvine, CA (US); Takeshi Kubo, Kanagawa-ken (JP); Ryogo Kanatani, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 565 days.

(21) Appl. No.: 11/023,614

(22) Filed: Dec. 29, 2004

(65) Prior Publication Data

US 2006/0075231 A1  Apr. 6, 2006

Related U.S. Application Data

(60) Provisional application No. 60/614,435, filed on Sep. 29, 2004.

(51) Int. Cl.
*H04L 9/32* (2006.01)
(52) U.S. Cl. .......... 713/168; 713/150; 713/170; 705/76
(58) Field of Classification Search .................. 726/2
See application file for complete search history.

(56) References Cited

U.S. PATENT DOCUMENTS

| | | | | |
|---|---|---|---|---|
| 5,493,105 A * | 2/1996 | Desai | | 235/375 |
| 5,732,229 A | 3/1998 | Dickinson | | 395/334 |
| 5,764,629 A | 6/1998 | Bower et al. | | 370/296 |
| 5,774,117 A | 6/1998 | Kukkal et al. | | 345/330 |
| 5,845,261 A | 12/1998 | McAbian | | 705/26 |
| 5,852,807 A | 12/1998 | Skarbo et al. | | 705/7 |
| 6,016,484 A * | 1/2000 | Williams et al. | | 705/39 |
| 6,137,710 A | 10/2000 | Iwasaki et al. | | 365/52 |
| 6,157,954 A | 12/2000 | Moon et al. | | 709/228 |
| 6,175,741 B1 | 1/2001 | Alperovich | | 455/458 |
| 6,195,686 B1 | 2/2001 | Moon et al. | | 709/206 |
| 6,254,001 B1 | 7/2001 | Chan | | 235/380 |
| 6,324,525 B1 * | 11/2001 | Kramer et al. | | 705/40 |
| 6,397,219 B2 | 5/2002 | Mills | | 1/1 |
| 6,442,263 B1 | 8/2002 | Beaton et al. | | 379/142.04 |
| 6,533,171 B1 | 3/2003 | Porter | | 235/380 |

(Continued)

FOREIGN PATENT DOCUMENTS

JP  07-064923  10/1995

(Continued)

OTHER PUBLICATIONS

Andreas Berger, "Privacy Protection for Public Directory Services," 1998, Computer Networks and ISDN Systems, pp. 1-9.*

(Continued)

*Primary Examiner* — Luu Pham
(74) *Attorney, Agent, or Firm* — Merchant & Gould (57) ABSTRACT

A terminal and a method for exchanging electronic business cards that can guarantee privacy and guarantee complete and consistent communications to the user are provided. The terminal for exchanging electronic business cards with a device connected via a communications network stores the first public key and the first secret key, the first electronic certificate that includes the first public key and components of an electronic business card. The terminal prepares a first electronic business card from the components of an electronic business card that have been read from the memory, transmits the first electronic business card, together with the first electronic certificate that has been read from the memory, receives data encrypted by using the first public key, and decodes the encrypted data that has been received by using the first secret key that has been read from the memory.

20 Claims, 7 Drawing Sheets

U.S. PATENT DOCUMENTS

| | | | | |
|---|---|---|---|---|
| 6,609,653 B1* | 8/2003 | Lapstun et al. | ............... | 235/375 |
| 6,760,728 B1 | 7/2004 | Osborn | ................ | 1/1 |
| 6,816,725 B1* | 11/2004 | Lemke et al. | .............. | 455/414.1 |
| 6,857,072 B1* | 2/2005 | Schuster et al. | ............. | 713/160 |
| 6,868,426 B1 | 3/2005 | Mankoff | ................ | 707/104.1 |
| 6,873,861 B2* | 3/2005 | Awada et al. | ................ | 455/566 |
| 6,883,000 B1 | 4/2005 | Gropper | ................ | 1/1 |
| 6,888,927 B1 | 5/2005 | Cruickshank et al. | ...... | 379/88.11 |
| 6,889,213 B1* | 5/2005 | Douvikas et al. | .............. | 705/67 |
| 6,954,934 B2 | 10/2005 | Kumar | ................ | 719/317 |
| 6,963,845 B1* | 11/2005 | Lapstun et al. | ................ | 705/1.1 |
| 6,983,371 B1 | 1/2006 | Hurtado et al. | ................ | 713/189 |
| 7,003,546 B1* | 2/2006 | Cheah et al. | .................. | 709/200 |
| 7,007,068 B2 | 2/2006 | Morkel | ................ | 709/206 |
| 7,017,109 B1* | 3/2006 | Douvikas et al. | ............. | 715/236 |
| 7,039,869 B2 | 5/2006 | Smith | ................ | 715/716 |
| 7,043,531 B1 | 5/2006 | Seibel et al. | .................. | 709/206 |
| 7,047,041 B2 | 5/2006 | Vänskä et al. | ................ | 455/558 |
| 7,062,656 B2* | 6/2006 | Richards et al. | ............... | 713/185 |
| 7,109,985 B2 | 9/2006 | Spencer et al. | ................ | 345/418 |
| 7,194,426 B1* | 3/2007 | Box | ................ | 705/26.1 |
| 7,221,910 B2* | 5/2007 | Ishii et al. | .................... | 455/41.2 |
| 7,228,335 B2 | 6/2007 | Caughey | | |
| 7,246,099 B2 | 7/2007 | Feldhahn | ................ | 705/65 |
| 7,255,267 B2 | 8/2007 | Chao | ................ | 235/380 |
| 7,280,975 B1 | 10/2007 | Donner | ................ | 705/10 |
| 7,289,110 B2 | 10/2007 | Hansson | ................ | 345/173 |
| 7,322,007 B2 | 1/2008 | Schowtka et al. | ............. | 715/513 |
| 7,337,127 B1 | 2/2008 | Smith et al. | .................... | 705/14 |
| 7,340,214 B1* | 3/2008 | Hamberg | ................ | 455/41.2 |
| 7,387,234 B2 | 6/2008 | Kanatani et al. | ............. | 235/375 |
| 7,451,099 B2 | 11/2008 | Henkin et al. | ................ | 705/14 |
| 7,483,179 B2 | 1/2009 | Stumbo et al. | ................ | 358/402 |
| 7,607,084 B2 | 10/2009 | Malone et al. | ................ | 715/255 |
| 7,753,260 B2 | 7/2010 | Kanatani et al. | ............. | 235/375 |
| 7,814,438 B2* | 10/2010 | Grossman et al. | ............ | 715/854 |
| 7,974,877 B2 | 7/2011 | Ramanathan et al. | ..... | 705/14.55 |
| 8,005,904 B2 | 8/2011 | Yokoyama et al. | ........... | 709/206 |
| 2001/0021935 A1 | 9/2001 | Mills | ................ | 707/513 |
| 2001/0027472 A1 | 10/2001 | Guan | ................ | 709/203 |
| 2001/0032251 A1 | 10/2001 | Rhoads et al. | ................ | 709/217 |
| 2002/0013815 A1* | 1/2002 | Obradovich et al. | ......... | 709/204 |
| 2002/0035566 A1 | 3/2002 | Rugg | ................ | 707/100 |
| 2002/0055955 A1 | 5/2002 | Lloyd-Jones et al. | ........ | 707/512 |
| 2002/0095384 A1 | 7/2002 | Pestoni et al. | ................ | 705/51 |
| 2002/0095454 A1* | 7/2002 | Reed et al. | ................ | 709/201 |
| 2002/0107938 A1 | 8/2002 | Moroney et al. | ............. | 709/218 |
| 2002/0116396 A1 | 8/2002 | Somers et al. | ................ | 707/200 |
| 2002/0130185 A1 | 9/2002 | LaForge et al. | ............. | 235/487 |
| 2002/0133482 A1 | 9/2002 | Wen Hung | ................ | 707/3 |
| 2002/0138633 A1* | 9/2002 | Angwin et al. | ............. | 709/229 |
| 2002/0152086 A1* | 10/2002 | Smith et al. | .................... | 705/1 |
| 2002/0188606 A1 | 12/2002 | Sun et al. | ................ | 707/10 |
| 2003/0005298 A1* | 1/2003 | Smith et al. | .................... | 713/153 |
| 2003/0020959 A1 | 1/2003 | Henry | ................ | 358/402 |
| 2003/0050920 A1 | 3/2003 | Sun | ................ | 707/2 |
| 2003/0066877 A1 | 4/2003 | Howard et al. | ............. | 235/380 |
| 2003/0110130 A1 | 6/2003 | Pelletier | ................ | 705/50 |
| 2003/0131001 A1* | 7/2003 | Matsuo | ................ | 707/9 |
| 2003/0158860 A1 | 8/2003 | Caughey | | |
| 2003/0158893 A1 | 8/2003 | Komatsu et al. | ............. | 709/203 |
| 2003/0163705 A1 | 8/2003 | Richards, Jr. et al. | ........ | 713/182 |
| 2003/0203744 A1 | 10/2003 | Otsuka | ................ | 455/551 |
| 2004/0019521 A1 | 1/2004 | Birmingham | ................ | 705/14 |
| 2004/0031856 A1* | 2/2004 | Atsmon et al. | ............. | 235/492 |
| 2004/0076345 A1 | 4/2004 | Olszak et al. | ................ | 382/309 |
| 2004/0133520 A1 | 7/2004 | Callas et al. | ................ | 705/51 |
| 2004/0133774 A1* | 7/2004 | Callas et al. | ................ | 713/153 |
| 2004/0153328 A1 | 8/2004 | Macholda | ................ | 705/1 |
| 2004/0181517 A1 | 9/2004 | Jung et al. | ................ | 707/3 |
| 2004/0181540 A1 | 9/2004 | Jung et al. | ................ | 707/100 |
| 2004/0207878 A1 | 10/2004 | Ferlitsch | ................ | 358/2.1 |
| 2004/0243496 A1* | 12/2004 | Kim et al. | ................ | 705/35 |
| 2004/0243930 A1 | 12/2004 | Schowtka et al. | ........... | 715/513 |
| 2005/0004978 A1* | 1/2005 | Reed et al. | ................ | 709/203 |
| 2005/0010490 A1 | 1/2005 | Liu | ................ | 705/26 |
| 2005/0091074 A1 | 4/2005 | Feldhahn | ................ | 705/1 |
| 2005/0103838 A1 | 5/2005 | Slotkin et al. | ................ | 235/380 |
| 2005/0113025 A1 | 5/2005 | Akamatsu et al. | ........... | 455/41.3 |
| 2005/0122543 A1 | 6/2005 | Walker | ................ | 358/1.18 |
| 2005/0165621 A1 | 7/2005 | Lapstun et al. | ................ | 705/1 |
| 2005/0182644 A1 | 8/2005 | Douvikas et al. | ................ | 705/1 |
| 2005/0233697 A1 | 10/2005 | Yu | ................ | 455/41.3 |
| 2005/0239439 A1 | 10/2005 | Manabe | ................ | 455/410 |
| 2005/0251448 A1 | 11/2005 | Gropper | ................ | 705/14 |
| 2005/0266798 A1* | 12/2005 | Moloney et al. | .............. | 455/41.2 |
| 2005/0289474 A1 | 12/2005 | Master et al. | ................ | 715/765 |
| 2006/0036548 A1* | 2/2006 | Roever et al. | ................ | 705/51 |
| 2006/0038447 A1 | 2/2006 | Bruelle-Drews | ............... | 37/10.1 |
| 2006/0065707 A1 | 3/2006 | Kanatani et al. | ............. | 235/375 |
| 2006/0065708 A1 | 3/2006 | Kanatani et al. | ............. | 235/375 |
| 2006/0075050 A1 | 4/2006 | Kanatani et al. | ............. | 709/206 |
| 2006/0088214 A1 | 4/2006 | Handley et al. | ............... | 382/176 |
| 2006/0184574 A1 | 8/2006 | Wu et al. | ................ | 707/104.1 |
| 2006/0229988 A1* | 10/2006 | Oshima et al. | ................ | 705/50 |
| 2006/0270388 A1 | 11/2006 | Veeramachaneni et al. | ........................ | 455/412.1 |
| 2006/0293903 A1 | 12/2006 | Ramanathan et al. | ............ | 705/1 |
| 2006/0293904 A1 | 12/2006 | Ramanathan et al. | ............ | 705/1 |
| 2006/0293905 A1 | 12/2006 | Ramanathan et al. | ............ | 705/1 |
| 2007/0156831 A1 | 7/2007 | Quine | ................ | 709/206 |
| 2009/0116687 A1 | 5/2009 | Rhoads et al. | ................ | 382/100 |
| 2009/0216839 A1 | 8/2009 | Yokoyama et al. | ........... | 709/206 |
| 2009/0217199 A1 | 8/2009 | Hara et al. | ................ | 715/808 |

FOREIGN PATENT DOCUMENTS

| | | |
|---|---|---|
| JP | 08-008962 | 1/1996 |
| JP | 10-190645 | 7/1998 |
| JP | 2001-249863 | 9/2001 |
| JP | 2001-282793 | 10/2001 |
| JP | 2002-297855 | 10/2002 |
| JP | 2002-334046 | 11/2002 |
| JP | 2003-006161 | 1/2003 |
| JP | 2003-30211 | 1/2003 |
| JP | 2003-123035 | 4/2003 |
| JP | 2003-309552 | 10/2003 |
| JP | 2003-348077 | 12/2003 |
| JP | 2004-164166 | 6/2004 |
| JP | 2004-192138 | 7/2004 |
| JP | 2004-362264 | 12/2004 |
| JP | 2005-018746 | 1/2005 |
| JP | 4416644 | 12/2009 |
| WO | WO 1999/29127 | 10/1999 |

OTHER PUBLICATIONS

PCT, International Search Report, Jul. 27, 2007, pp. 7.
PCT, International Search Report, Aug. 15, 2007, pp. 7.
U.S. Office Action mailed Mar. 31, 2008 in U.S. Appl. No. 11/159,837.
U.S. Office Action mailed Apr. 7, 2008 in U.S. Appl. No. 11/159,838.
U.S. Office Action mailed Feb. 6, 2006 in U.S. Appl. No. 11/023,602.
U.S. Final Office Action mailed Jul. 24, 2006 in U.S. Appl. No. 11/023,602.
U.S. Office Action mailed Dec. 19, 2007 in U.S. Appl. No. 11/023,602.
U.S. Office Action mailed May 13, 2008 in U.S. Appl. No. 11/023,617.
U.S. Office Action mailed Nov. 6, 2006 in U.S. Appl. No. 11/023,612.
U.S. Office Action mailed Apr. 19, 2007 in U.S. Appl. No. 11/023,612.
U.S. Final Office Action mailed Sep. 25, 2007 in U.S. Appl. No. 11/023,612.
PCT, Application No. PCT/US2006/25574, International Search Report, Mar. 29, 2007, pp. 9.
U.S. Final Office Action mailed Dec. 3, 2008 in U.S. Appl. No. 11/159,837.
U.S. Final Office Action mailed Jan. 16, 2009 in U.S. Appl. No. 11/159,838.
U.S. Office Action mailed May 14, 2009 in U.S. Appl. No. 11/159,837.
U.S. Office Action mailed Mar. 24, 2009 in U.S. Appl. No. 11/159,840.
U.S. Office Action mailed Jun. 8, 2009 in U.S. Appl. No. 11/023,617.
U.S. Office Action mailed Sep. 4, 2009 in U.S. Appl. No. 11/023,602.

(1997) vCard: The Electronic Business Card:; Version 2.1; A versit Consortium White Paper; http://www.imc.org/pdi/vcardwhite.ht.; Jan. 1997.
U.S. Final Office Action mailed Jan. 6, 2010 in U.S. Appl. No. 11/023,602.
U.S. Final Office Action mailed Jan. 27, 2010 in U.S. Appl. No. 11/023,617.
U.S. Final Office Action mailed Dec. 3, 2009 in U.S. Appl. No. 11/159,837.
U.S. Final Office Action mailed Mar. 15, 2010, in U.S. Appl. No. 11/159,840.
U.S. Office Action mailed Apr. 2, 2010, in U.S. Appl. No. 11/917,673.
U.S. Office Action mailed May 12, 2010, in U.S. Appl. No. 11/159,837.
U.S. Final Office Action mailed May 19, 2010, in U.S. Appl. No. 11/023,614.
PCT, Application No. PCT/U2006/017582, International Search Report, May 4, 2010, pp. 10.
U.S. Final Office Action mailed Jul. 7, 2010, in U.S. Appl. No. 11/159,840.
European Office Action, dated Jul. 6, 2010, cited in Appl. No. 06 770 057.5.
U.S. Office Action mailed Sep. 8, 2010, in U.S. Appl. No. 11/917,673.
U.S. Office Action mailed Feb. 16, 2007 in U.S. Appl. No. 11/023,602.
U.S. Final Office Action mailed Feb. 13, 2009 in U.S. Appl. No. 11/023,617.
U.S. Final Office Action mailed Oct. 15, 2009, in U.S. Appl. No. 11/159,840.
U.S. Final Office Action mailed Aug. 4, 2010 in U.S. Appl. No. 11/023,617.
Notice of Rejection mailed Oct. 22, 2010, in Japanese Patent Application No. 2004-381102, *with* English translation.
Notice of Allowance mailed Mar. 31, 2011 in U.S. Appl. No. 11/917,673.
Notice of Allowance mailed Apr. 11, 2011 in U.S. Appl. No. 11/159,837.
Learn the Basics, Source on Use of PC, vol. 5, Electronic Mail, Nikkei Business Publications, Inc., Japan, Aug. 1, 1998, pp. 94-106 (cited in JP Notice of Rejection Apr. 28, 2011).
Notice of Rejection mailed Apr. 28, 2011, in Japanese Patent Application No. 2008-518157, *with* English translation.
Notice of Rejection mailed Oct. 22, 2010, in Japanese Patent Application No. 2005-192933, *with* English translation.
U.S. Office Action mailed Jan. 24, 2011 in U.S. Appl. No. 11/023,617.
Sub Notice of Allowance mailed Feb. 3, 2011 in U.S. Appl. No. 11/159,837.
Notice of Allowance mailed Mar. 31, 2011 in U.S. Appl. No. 11/917,673.
Japanese Office Action mailed Feb. 15, 2011, cited in Application No. 2004-381102.
U.S. Office Action mailed Oct. 11, 2011, in U.S. Appl. No. 11/159,840.
Response to Non-Final Office Action mailed Feb. 6, 2006, filed May 4, 2006 in U.S. Appl. No. 11/023,602.
Response to Final Office Action mailed Jul. 24, 2006, filed Sep. 15, 2006 in U.S. Appl. No. 11/023,602.
Advisory Office Action mailed Oct. 2, 2006, in U.S. Appl. No. 11/023,602
Response to Advisory Action mailed Oct. 2, 2006, filed Nov. 30, 2006 in U.S. Appl. No. 11/023,602.
Response to Non-Final Office Action mailed Nov. 6, 2006, filed Feb. 6, 2007 in U.S. Appl. No. 11/023,612.
Response to Non-Final Office Action mailed Apr. 19, 2007, filed Jul. 19, 2007 in U.S. Appl. No. 11/023,612.
Response to Final Office Action mailed Sep. 25, 2007, filed Jan. 24, 2008 in U.S. Appl. No. 11/023,612.
Response to Non-Final Office Action mailed Oct. 26, 2007, filed Mar. 26, 2008 in U.S. Appl. No. 11/023,614.
Response to Non-Final Office Action mailed Dec. 19, 2007, filed Jun. 19, 2008 in U.S. Appl. No. 11/023,602.
Notice of Allowance mailed Feb. 13, 2008, in U.S. Appl. No. 11/023,612.
Response to Non-Final Office Action mailed Mar. 31, 2008, filed Sep. 2, 2008 in U.S. Appl. No. 11/159,837.
Response to Non-Final Office Action mailed Apr. 7, 2008, filed Sep. 8, 2008 in U.S. Appl. No. 11/159,838.
Response to Non-Final Office Action mailed May 13, 2008, filed Nov. 12, 2008 in U.S. Appl. No. 11/023,617.
Notice of Allowance mailed Oct. 20, 2008, in U.S. Appl. No. 11/023,602.
Response to Final Office Action mailed Dec. 3, 2008, filed Mar. 3, 2009 in U.S. Appl. No. 11/159,837.
Response to Non-Final Office Action mailed Jan. 21, 2009, filed May 21, 2009 in U.S. Appl. No. 11/023,614.
Notice of Allowance mailed Jan. 26, 2009 in U.S. Appl. No. 11/023,602.
Response to Final Office Action mailed Feb. 13, 2009, filed May 13, 2009 in U.S. Appl. No. 11/023,617.
Response to Non-Final Office Action mailed Mar. 24, 2009, filed Jul. 24, 2009 in U.S. Appl. No. 11/159,840.
Response to Non Final Office Action mailed May 14, 2009, filed Aug. 14, 2009 in U.S. Appl. No. 11/159,837.
Response to Non-Final Office Action mailed Jun. 8, 2009, filed Sep. 8, 2009 in U.S. Appl. No. 11/023,617.
Response to Non-Final Office Action mailed Sep. 4, 2009, filed Dec. 4, 2009 in U.S. Appl. No. 11/023,602.
Response to Final Office Action mailed Oct. 15, 2009, filed Jan. 14, 2010 in U.S. Appl. No. 11/159,840.
Response to Final Office Action mailed Dec. 3, 2009, filed Mar. 3, 2010 in U.S. Appl. No. 11/159,837.
Response to Non-Final Office Action mailed Mar. 15, 2010, filed Jun. 15, 2010 in U.S. Appl. No. 11/159,840.
Response to Non-Final Office Action mailed Apr. 2, 2010, filed Jul. 2, 2010 in U.S. Appl. No. 11/917,673.
Response to Final Office Action mailed May 12, 2010, filed Sep. 13, 2010 in U.S. Appl. No. 11/159,837.
Notice of Allowance mailed May 20, 2010 in U.S. Appl. No. 11/023,602.
Response to Final Office Action mailed Jul. 7, 2010, filed Nov. 8, 2010 in U.S. Appl. No. 11/159,840.
Response to Non-Final Office Action mailed Aug. 4, 2010, filed Nov. 4, 2010 in U.S. Application No. 11/023,617.
Response to Final Office Action mailed Sep. 8, 2010, filed Dec. 8, 2010 in U.S. Appl. No. 11/917,673.
Notice of Allowance mailed Nov. 15, 2010 in U.S. Appl. No. 11/159,837.
Notice of Allowance mailed Dec. 28, 2010 in U.S. Appl. No. 11/917,673.
Notice from the European Patent Office dated Oct. 1, 2007 concerning business methods, Official Journal EPO, XP007905525, Nov. 2007, 2 pages.
Notice of Rejection mailed on Nov. 18, 2008, in Japanese Patent Application No. 2004-381104.
Notice of Rejection mailed on Jan. 20, 2009, in Japanese Patent Application No. 2004-381103.
Response filed Feb. 18, 2009, in Japanese Patent Application No. 2004-381104.
Notice of Final Rejection mailed on Mar. 13, 2009, in Japanese Patent Application No. 2004-381104.
The People's Republic of China Notice on the First Office Action dispatched Mar. 20, 2009, in Application No. 200680024080.8.
European Communication and Extended Search Report dated Jul. 21, 2009, in Application No. 067859603.
Notice of Allowance from Japan Patent Office mailed Oct. 23, 2009, for Japanese Patent Application No. 2004-381103.
The People's Republic of China Notice on the First Office Action dispatched Oct. 27, 2010, in Application No. 200680018489.9.

* cited by examiner

TERMINAL FOR EXCHANGING ELECTRONIC BUSINESS CARDS

The present invention claims priority to U.S. provisional patent application Ser. No. 60/614,435 filed Sep. 29, 2004, and incorporated herein in its entirety.

BACKGROUND OF THE INVENTION

1. Field of the Invention

The present invention relates to a terminal for exchanging electronic business cards and a method for the same.

2. Description of the Related Art

Instead of giving another person a business card in a paper form, personal information (hereinafter, referred to as business card information) including a name, an organization name, a telephone number, etc., described in the business card is usually brought to other person by using an electronic mail through the Internet. As a data format of the business card information used in Internet communications, "RFC 2426-vCard MIME Directory Profile" 1998 is well known.

The business card information to be transmitted in this data format includes a business card image and a plurality of sets of character strings of personal information to be composed with the image. For example, a business card is displayed on the display screen of a receiving side computer as shown in FIG. 1.

Figure 1:
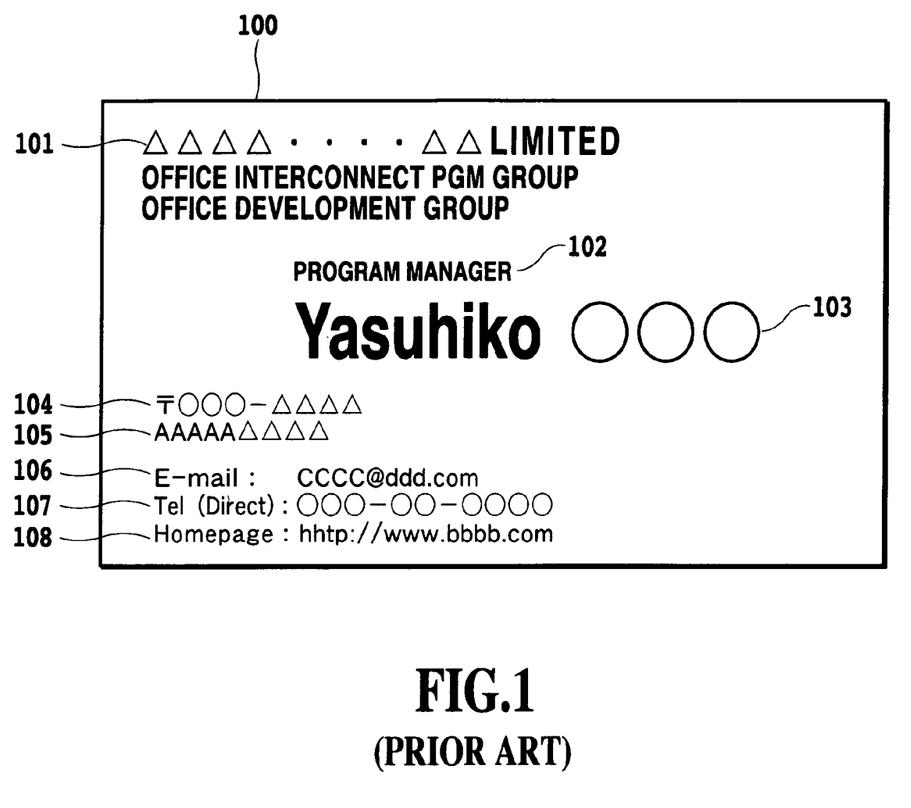
FIG. 1 is a diagram illustrating a conventional electronic business card.

The electronic business card shown in FIG. 1 denotes a business card image 100, a company name 101, a title 102, a personal name 103, a postal code 104, a company address 105, an e-mail address 106, a telephone number 107, and a URL 108. In communications of information on the business card, normally, information including character codes of these pieces of information is received by a receiving side computer. The receiving side computer arranges the character codes of the fields in a predetermined layout, and a converted image is composed with the business card image 100 and displayed on the display screen.

As a result of such a standardization of business card information, it has become possible for electronic business cards to contribute to increased convenience for users in electronic commerce and the like.

A service is known where a user registers business card information as described above in a server computer, and the client computers of the registered user exchange the registered business cards via the server. (Japanese Patent Application Laid-open No. 2000-32033)

There is a problem, however, where such data can be easily sniffed out or intercepted by a malicious person on the internet.

A malicious person may, for example, pretend to be another person, and may transmit information or request information. A malicious person may intercept information on the internet so as to sell it, or may disclose or utilize it for the purpose of perpetrating harm. In addition, the malicious person may transfer information for the designated person to an unspecified third party.

SUMMARY OF THE INVENTION

An object of the present invention is to provide a terminal and a method for exchanging electronic business cards that can guarantee privacy and that can guarantee complete and constant communications to the user.

In addition, the present invention provides a terminal for exchanging electronic business cards that can guarantee privacy without causing inconvenience in normal utilization by the user, and that can guarantee complete and constant communications to the user.

One aspect of the invention provides A terminal for exchanging electronic business cards with an external device connected via a communications network, said terminal comprising: a memory means for storing a first pair of keys consists of a first public key and a first secret key, a first electronic certificate that includes the first public key and components of an electronic business card; an electronic business card preparing means for preparing a first electronic business card from the components of an electronic business card that have been read from the memory means; an electronic business card transmitting means for transmitting the first electronic business card that has been prepared by the electronic business card preparing means, together with the first electronic certificate that has been read from the memory means; an encrypted data receiving means for receiving data encrypted by using the first public key; and a data decoding means for decoding the encrypted data that has been received by the encrypted data receiving means by using the first secret key that has been read from the memory means.

In addition, the terminal according to the first aspect of the present invention may be provided with: an electronic business card receiving means for receiving a second electronic business card, together with a second electronic certificate that includes a second public key; and an encrypted data transmitting means for encrypting data by using the second public key that is included in the second electronic certificate that has been received by the electronic business card receiving means so as to transmit the encrypted data.

In addition, the terminal according to the first aspect of the present invention may be provided with: an electronic certificate searching means for searching for the first electronic certificate within the memory means; and a navigating means for proposing a method for obtaining one or more electronic certificates when the first electronic certificate has not been stored.

In addition, the terminal according to the first aspect of the present invention may be provided with: an electronic certificate searching means for searching for the first electronic certificate within the memory means; a security level determining means for determining the security level of the first electronic certificate that has been found; and a navigating means for proposing one or more methods for obtaining a new electronic certificate in the case where the security level does not satisfy a predetermined level.

In addition, the terminal according to the first aspect of the present invention may be provided with an electronic certificate preparing means for preparing a new electronic certificate on the basis of an instruction from the navigating means.

A second aspect of the present invention provides a method for exchanging electronic business cards between a terminal and a device connected via a communications network, the method performed by the terminal including: the step of storing a first pair of keys consists of a first public key and a first secret key, and a first electronic certificate that includes the first public key; the electronic business card preparing step of preparing a first electronic business card; the electronic business card transmitting step of reading the first electronic certificate that has been stored, and transmitting the first electronic business card that has been prepared; the encrypted data receiving step of receiving data encrypted by using the first public key; and the data decoding step of decoding the encrypted data that has been received by using the first secret key that has been stored.

In addition, the method according to the second aspect of the present invention may include: the electronic business card receiving step of receiving a second electronic business card, together with a second electronic certificate that includes a second public key; and the encrypted data transmitting step of encrypting data by using the second public key included in the second electronic certificate that has been received, so as to transmit the encrypted data.

In addition, the method according to the second aspect of the present invention may include: the electronic certificate searching step of searching for the first electronic certificate that has been stored; the step of determining the security level of the first electronic certificate that has been found; and the navigating step of proposing one or more methods for obtaining a new electronic certificate when the security level of the first electronic certificate does not satisfy a predetermined security level and has not been stored.

Furthermore, the method according to the second aspect of the present invention may include the electronic certificate preparing step of selecting the one or more methods that has been proposed, and preparing a new electronic certificate.

A third aspect of the present invention provides a computer readable storage medium having stored there on computer executable instructions for performing the method according to the second aspect of the present invention with a computer.

The above and other objects, effects, features and advantages of the present invention will become more apparent from the following description of embodiments thereof taken in conjunction with the accompanying drawings.

DESCRIPTION OF THE PREFERRED EMBODIMENTS

Hereinafter, embodiments of the invention are described in detail with reference to the accompanying drawings.

Figure 2:
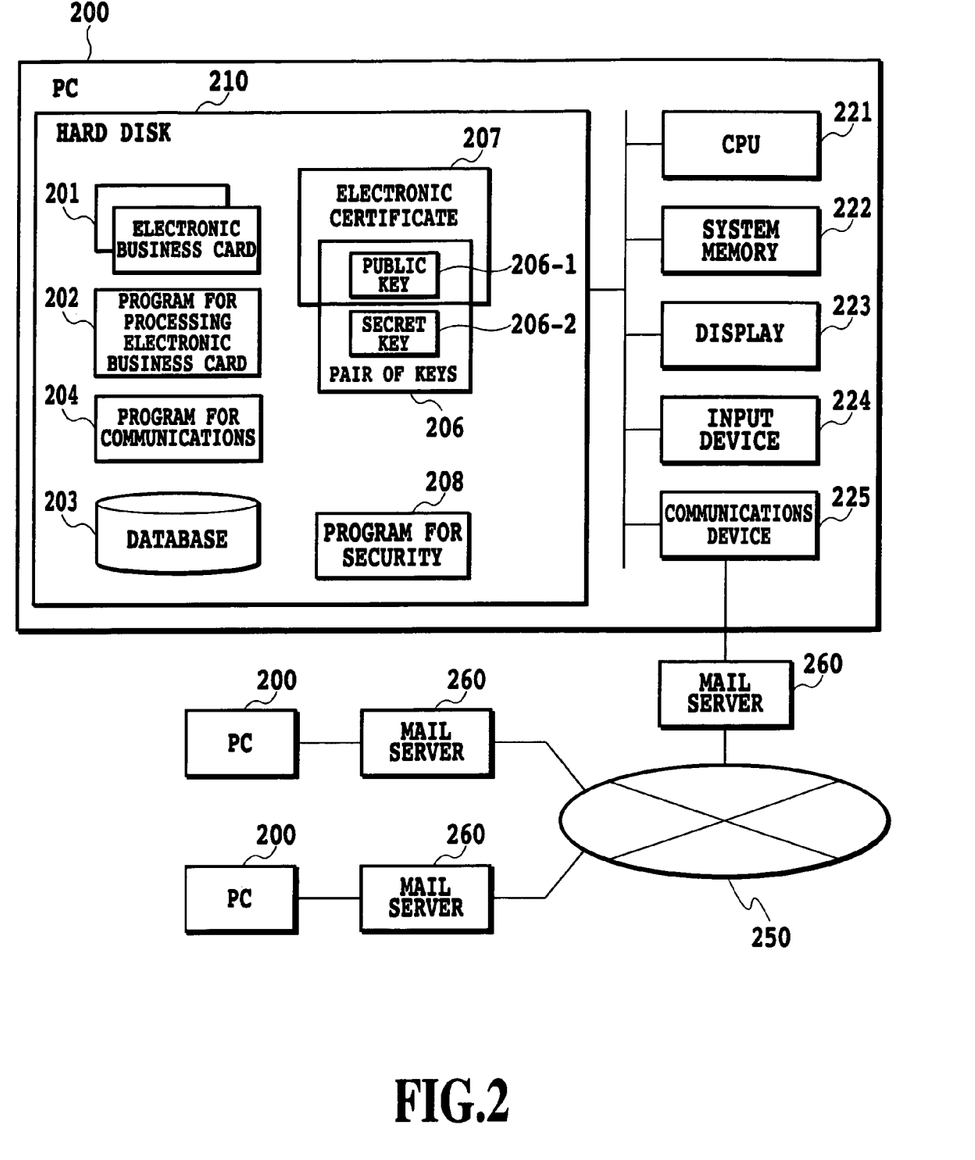
FIG. 2 is a block diagram showing the configuration of the entirety of a system according to an embodiment of the present invention.

FIG. 2 shows the system configuration of an electronic business card exchanging system to which the present invention has been implemented.

The electronic business card exchanging system of the present embodiment is provided with personal computers (hereinafter referred to as PC's) 200 which are connected via a communications network 250.

Commercially available PC's can be utilized for PC 200, and therefore, the hardware of these will be briefly described. A personal computer 200 has a hard disk 210, a CPU 221, a system memory 222, a display 223, an input device 224, and a communications device 225, such as a modem.

CPU 221 executes a variety of programs. System memory 222 stores information inputted into and outputted from CPU 221. Display 223 displays the results of information processing carried out by CPU 221, and information inputted by input device 223 on the display screen under the control of CPU 221. Input device 224 has a pointing device, such as a mouse and a keyboard, and inputs information into CPU 221.

Communications device 225 transmits and receives electronic mail to and from a mail server 260 within a provider, via communications network 250. In addition, communications device 225 is connected to communications network 250 so as to communicate with other PC'S 200. A mail server 260 sends and receives electronic mail to and from other mail servers 260 via communications network 250.

The following objects (data and programs) according to the present invention are stored in hard disk 210. An electronic business card 201 is an object which is prepared by a program 202 for processing an electronic business card, or which is received from another PC 200, so as to be stored in hard disk 210. Electronic business card 201 is a data set (set of a number of pieces of data) that includes character strings in character code form and image data for background images for a business card. Program 202 for processing an electronic business card is a program that has an electronic business card preparing function and the variety of functions described below, according to the present invention. Program 202 for processing an electronic business card is installed in hard disk 210, from a recording medium, such as a CDROM or a floppy disk, or via a communications medium. Database 203 stores information for managing the prepared electronic business cards and the received electronic business cards (generally referred to as management information), and a variety of information that relates to the electronic business cards (referred to as related information. Management information is included in the concept of the related information.)

(Program for Processing Electronic Business Card)

A program 204 for processing an electronic business card has the following functions. The individual functions are described in detail below.

(1) Electronic Business Card Preparing Function

This function prepares and edits a business card in image form.

(2) Management of Correspondence Record

In the case where an electronic business card is transmitted or received, a communications record of this transmission or reception is stored in database 203, so as to be managed as a correspondence record.

An information processing method for implementing the above-described functions is described below.

(Database)

The information that is managed by storing in database 203 includes the following information.

(1) Time and date of preparation, type and place of storage of the prepared electronic business card 201, as well as supplemental information, such as security setting of this electronic business card (2) Correspondence record concerning electronic business card The correspondence record includes a communications record, such as the time and date of reception of the received electronic business card 201, the electronic mail address of the sender, the name of the sender, the time and date of transmission of the transmitted electronic business card, the electronic mail address of the receiver, and the name of the receiver. Furthermore, the correspondence record includes a variety of correspondence information which has been inputted by the user with input device 224, which is, for example, a keyboard, and which relates to correspondence with a person indicated by each electronic business card.

(3) Address list prepared on the basis of personal information that has been obtained from electronic business cards and other business card related information These pieces of information are related to electronic business cards which are managed by the device, and are stored in database 203. The above-described number of types of data can be stored in database 203 as one record (data set), or each type of information of the above-described number of types of pieces of information may be separately stored in database 203.

Next, information processing according to the present invention is described. Such information processing is carried out by program 202 for processing an electronic business card, program 208 for security, and program 204 for communications.

(Electronic Business Card Preparing Function)

The contents of processing for preparing an electronic business card are well-known. Therefore, they are briefly described.

Figure 3:
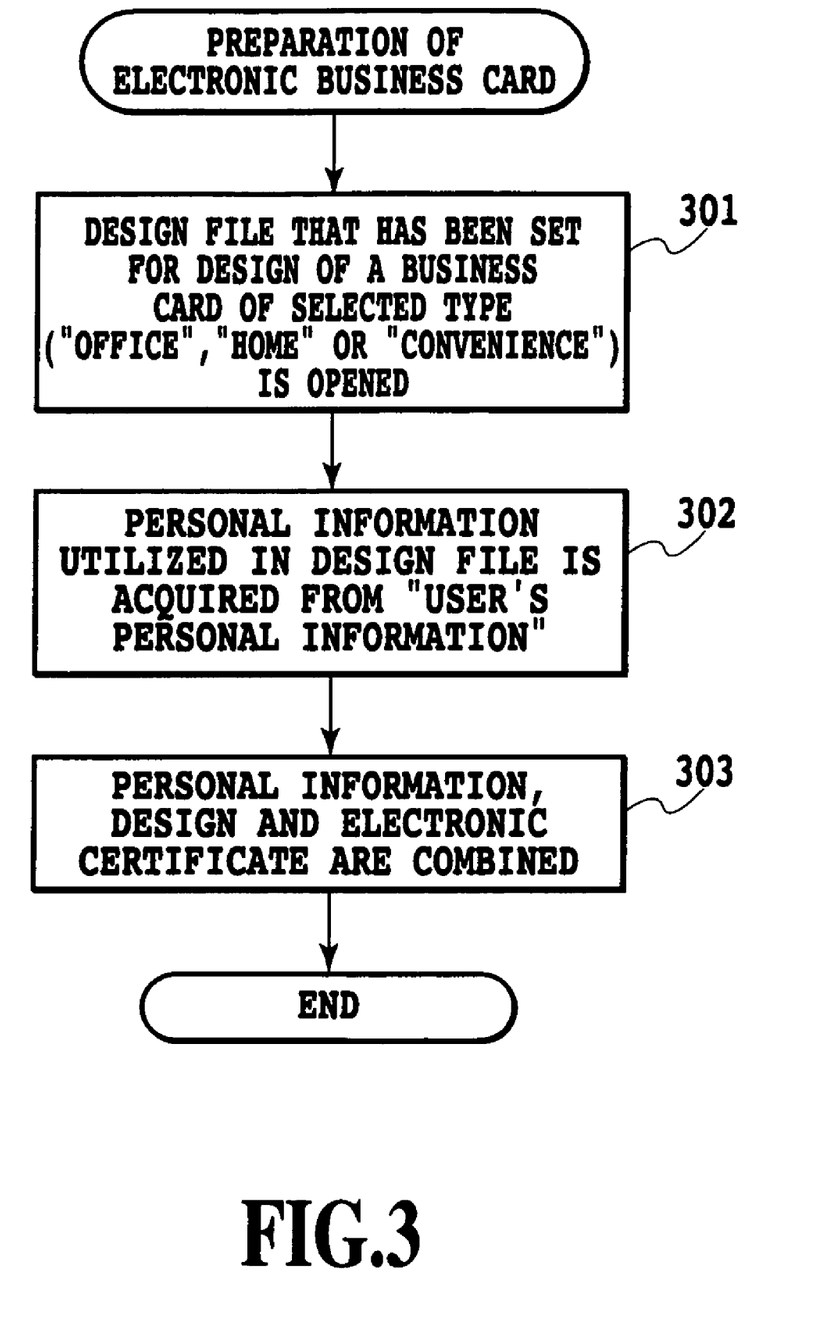
FIG. 3 is a flowchart showing the procedure of preparation processing of an electronic business card.

FIG. 3 shows the flow of processing for preparing an electronic business card that is included in program 202 for processing an electronic business card.

When a user selects an electronic business card preparing menu from the information on the display screen, for example, the processing program of FIG. 3 is executed by CPU 221. The user selects and opens a business card image for a desired background image from among business card design files that have been prepared in advance in hard disk 210 (the business card image is temporarily stored in system memory 222 and displayed on the display screen of display 223) (process 301). In the present embodiment, the business card design files are categorized into three categories, company, home and convenience, according to the purposes of use, and the user can select a desired image from the design files for the desired use.

Next, the user instructs CPU 221 to read the user's personal information, which has been initially registered in database 203. In response to this instruction, CPU 221 reads the user's personal information (in letter code form) from database 210, and temporarily stores it in system memory 222 (process 302).

CPU 221 converts the personal information temporarily stored in system memory 222 in letter code form, to an image. CPU 221 synthesizes in system memory 222 the converted image and the business card image for the background image that has been selected in process 301, and displays the resulting image on the display screen (process 303).

When the user designates the position of the personal information on the display screen by utilizing input device 224 such as a mouse, CPU 221 moves the personal information to the designated place. More specifically, CPU 221 again synthesizes in system memory 222 a new business card image by placing the personal information image in the place designated by the user on the business card image for the background image, and displays the business card image that has been again synthesized on the display screen of display 223.

In addition, CPU 221 can be configured to read an electronic certificate and prepares an electronic business card file by combining the personal information, the design and the electronic certificate that has been read, so that an electronic business card that is to be used can be synthesized in accordance with the flow shown in FIG. 3 whenever it is used. Here, "used" means to be attached to an electronic mail or the like.

When the user instructs completion by using a mouse or a keyboard, CPU 221 prepares a data set in the data format of an electronic business card standard (for example, RFC2426), including the personal information, the place thereof, and the image data for the background, which is then stored in a designated memory region in hard disk 210.

(b) Management of Correspondence Record

Management of the correspondence record, which is included in program 202 for processing an electronic business card, is described below. In the case where the prepared electronic business card is transmitted, and in the case where an electronic business card is received from another PC 200, this transmission record and reception record are stored as correspondence records in database 203. For example, the communications record included in the correspondence record includes the electronic mail address of the receiver of the transmitted electronic business card (in the case where the electronic business card is transmitted) or the transmitter of the electronic business card (in the case where the electronic business card is received), as well as the time and date of this transmission and reception. In addition, the communications record includes an encryption key (received public key) for encrypted communications with the electronic mail address.

The address list is an address list of persons to whom an electronic mail has been transmitted and from whom an electronic mail has been received. The address list describes the electronic business card information that has been obtained from received electronic business cards, that is to say, address list information such as names, addresses and telephone numbers. The above-described communications record is linked to the address list so that the communications record of a person whose name is in the address list can be retrieved, and so that the address list information of a person who corresponds to a communications record (transmission and reception record), or an electronic mail address within the communications record, can be retrieved.

Furthermore, in the case where an electronic business card is received by means of electronic mail from another PC 200, the personal information held by this electronic business card can be newly registered in the address list, automatically or manually, or it is possible to update the personal information that has been registered with the received personal information. In the case where the personal information held by the electronic business card is in conformity with RFC2426, for example, personal information, such as name, address and telephone number, can be registered or updated in the address list by referring to each attribute value.

(Program for Security)

The program for security is executed by CPU 221 so as to encrypt the electronic business card and other information that is to be transmitted from PC 200, or so as to decode the electronic business card and other information that has been encrypted by and transmitted from another PC 200.

In the case where an electronic business card and other information are encrypted before transmission or reception, for example, the 3DES algorithm is carried out by using a public key or a secret key, and the electronic business card and other information are encrypted or decoded before being outputted.

In addition, the program for security prepares a public key and a secret key, which are used for encryption/decoding of an electronic business card, and other information.

In addition, the program for security carries out the SHI algorithm and encryption with the public key, and prepares a digital signature for the transmitted data.

In addition, the program for security can issue an electronic certificate. For example, an electronic certificate including "the prepared public key and an algorithm such as the SHA-1 used when" the digital signature is prepared is issued.

Furthermore, the program for security can verify the received electronic certificate and digital signature.

(Electronic Certificate)

Electronics certificates are well-known. There are, for example, electronic certificates in conformity with the standard specification X.509 that is recommended by the International Telecommunications Union (ITU). An electronic certificate is constituted of items such as the version number of a public key, a serial number of the certificate, public key information, information on the certificate authority that has issued the certificate, the term of validity of the certificate, information on the person to be certified, and an expanded region. In addition, the expanded region can include information such as an electronic mail address and an IP address.

Electronic certificates include an electronic certificate that is issued by the certificate authority (for example, http://companyupdate.microsoft.com/company/redirect/10/outldigid.asp?/helplcid=1041), an electronic certificate that is issued by the information processing management department of an organization to which the user belongs, and an electronic certificate that is prepared by program 208 for security which is executed by CPU 221 within PC 200 of the user, as in the embodiment described below.

(Public Key and Secret Key)

Public keys and secret keys are well-known. A pair of keys consists of a public key and a secret key, and data that has been encrypted by using one key can be decoded by using the other key (public key encryption system). In general, public keys from among pairs of keys are keys that are disclosed to a third party. Public keys and secret keys are generated by program 208 for security, which is executed by CPU 221, and are stored in any one of the regions of hard disk 210.

(Digital Signature)

Digital signatures are well-known. A transmitter of data can be certified by applying the public key encryption system, for example, and at the same time, a digital signature that guarantees that this data is not interpolated can be provided. In addition, a digital signature can be provided by combining the "hash function, which is a one-directional function, such as SHA-1." The information that shows an algorithm used for a digital signature can be confirmed by an electronic certificate or the like. A digital signature is prepared by program 208 for security, which is executed by CPU 221.

(Program for Communications)

Program 204 for communications is a program for communications for transmitting and receiving electronic business cards to and from other PC's 200. Although it is not absolutely necessary, program 204 for communications is software for electronic mail in the present embodiment. A variety of communications programs can be utilized as other forms of program 204 for communications, in accordance with applications such as a communications program that utilizes, for example, a file transfer protocol (FTP) for data transmission.

Here, electronic mail is most preferable from among communications forms from the viewpoint of the general purpose. Furthermore, in the case where an electronic certificate or a digital signature is used, it is desirable to support an S/MIME data format, such as RFC2315 that is standardized by IETF.

Although a program for OS is additionally installed in hard disk 210, a commercially available OS is well known, and therefore, detailed description thereof is not required. In addition, background images that are utilized when an electronic business card is prepared and a variety of data required for business card processing are also stored in hard disk 210.

(Transmission of Electronic Business Card)

Figure 4:
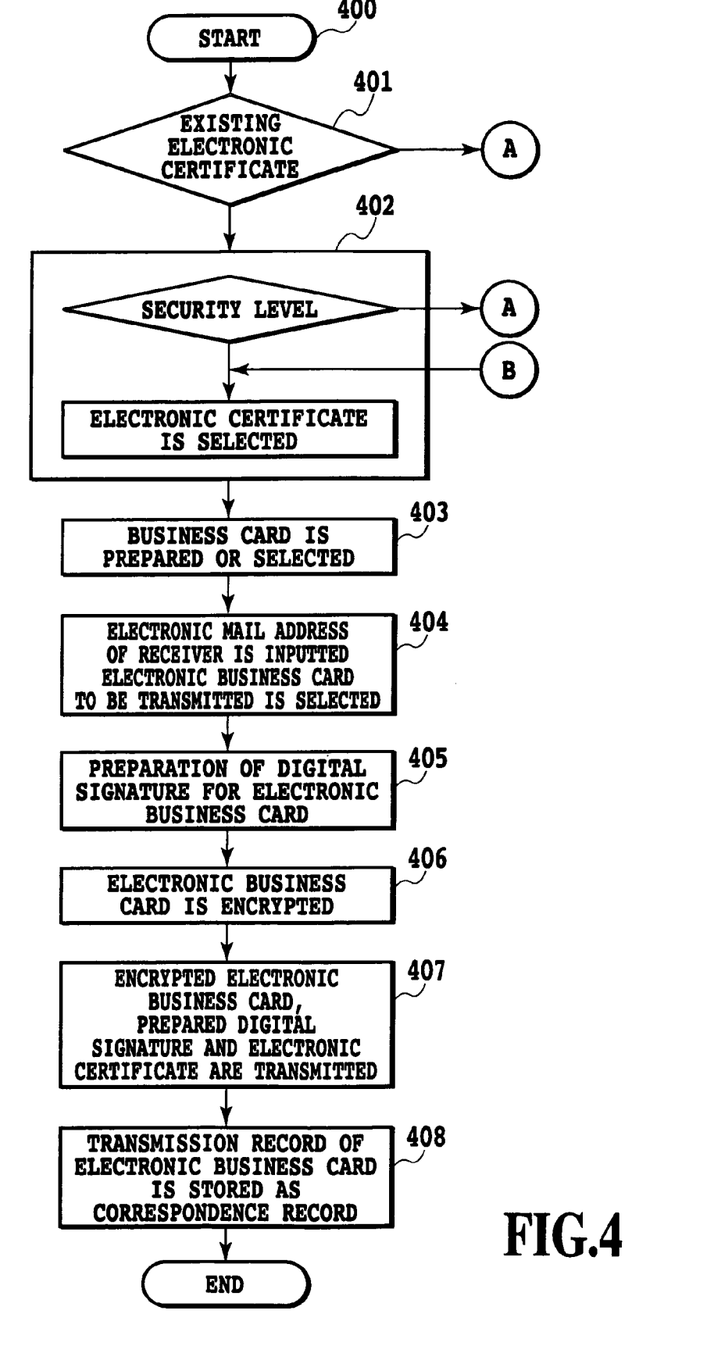
FIG. 4 is a flowchart showing the procedure of transmission processing of an electronic business card.
Figure 5:
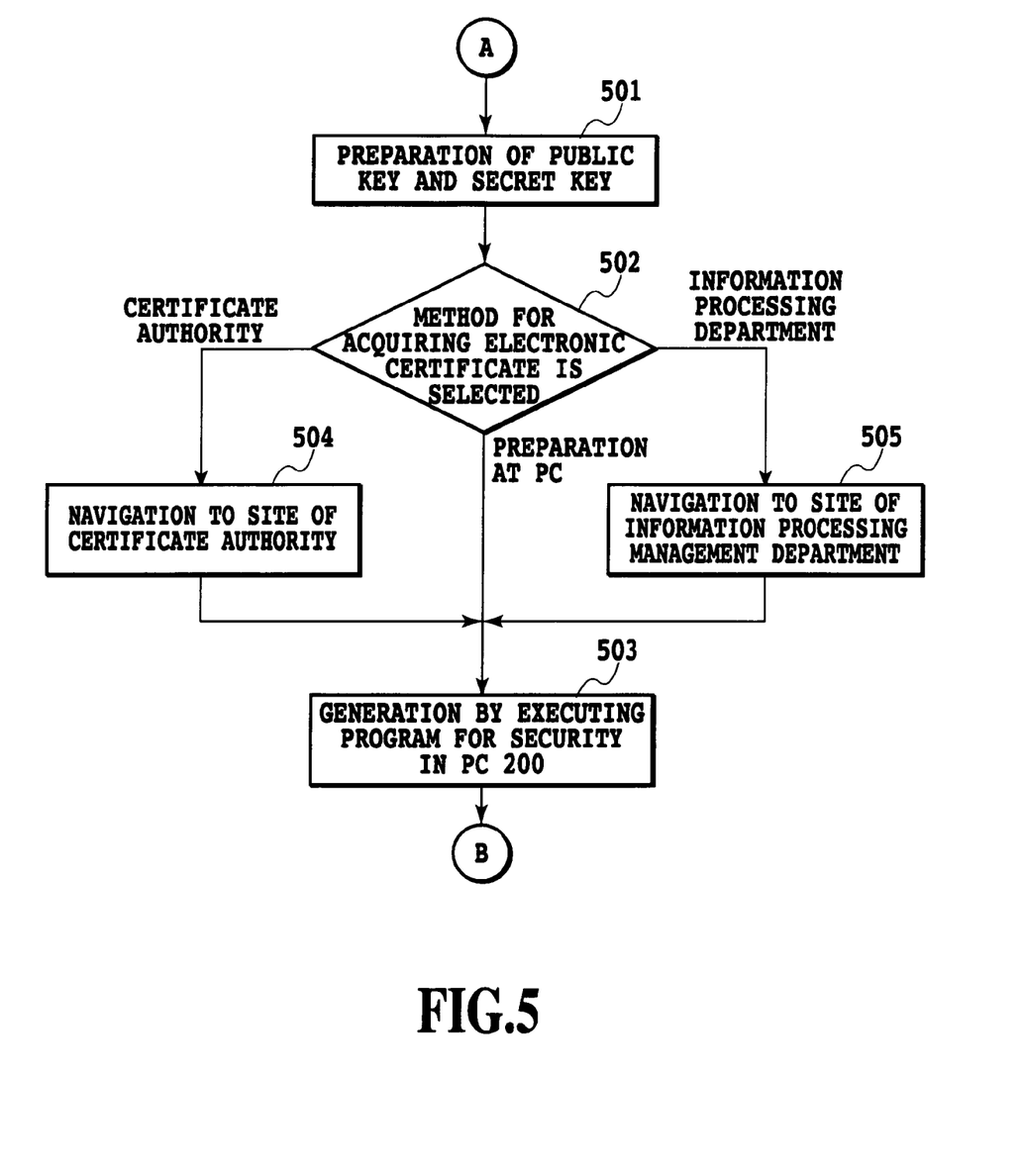
FIG. 5 is a flowchart showing the procedure of acquisition or preparation processing of an electronic certificate.

Next, the flow of transmission of an electronic business card is described in reference to FIG. 4 and FIG. 5.

In Step 401, an existing electronic certificate is searched for within hard disk 210. When an existing electronic certificate is not found, the procedure goes to the flow for obtaining or preparing an electronic certificate (FIG. 5). On the other hand, when an existing electronic certificate has been found, the procedure goes to Step 402.

In Step 402, the electronic certificate that has been searched for is selected as an electronic certificate 207 that is used for transmission or reception of an electronic business card and other information. Here, the security level is determined on the basis of the term of validity and the like of the existing electronic certificate, and therefore, the procedure may go to the flow for obtaining or preparing a new electronic certificate (FIG. 5).

In Step 403, an electronic business card is prepared or selected. The step of preparing an electronic business card includes the above step described in reference to FIG. 3.

In Step 404, the person to whom the electronic business card is transmitted is selected or inputted, and the electronic business card to be transmitted is selected. In the present embodiment, the electronic business card is transmitted in the form of an electronic mail, and therefore, the receiver's electronic mail address is inputted.

In Step 405, a digital signature that is attached to the electronic business card to be transmitted is prepared. For example, the program for security may be executed by CPU 221, and "a message digest may prepared by using the SHA-1 algorithm for the" electronic business card, and be encrypted with the secret key of the user at the transmitter, thereby preparing a digital signature.

In Step 406, the electronic business card to be transmitted is encrypted. For example, the program for security may be executed by CPU 221, and the electronic business card may be encrypted by the 3DES algorithm using a secret key, at the transmitter. Here, the encryption of the electronic business card in Step 406 can be selectively carried out by following an instruction from the user.

In Step 407, the encrypted electronic business card, the prepared digital signature and the electronic certificate are transmitted. The encrypted electronic business card, the prepared digital signature and the electronic certificate can be transmitted in the S-MIME data format. The electronic certificate includes the electronic mail address of the user on the transmission side, the public key, the information that shows the algorithm utilized for the encryption of the electronic business card and the like. Accordingly, other PC's 200 can verify the received digital signature by using information that is included in the received electronic certificate, such as the public key, and can decode the encrypted electronic business card.

In Step 408, the program for processing an electronic business card stores the transmission record of the electronic business card as the correspondence record in database 203.

(Acquisition or Preparation of Electronic Certificate)

Next, the flow of obtaining or preparing an electronic certificate is described in reference to FIG. 5.

In Step 501, a pair of keys, or a public key and a secret key, is prepared. A method for preparing a pair of keys in accordance with a known RSA encryption algorithm or the like can be used as a method for preparing a public key and a secret key. In addition, when a pair of keys exists within the hard disk of a PC 200, that is to say, when a known pair of keys exists while an electronic certificate that is connected to the public key from this pair of keys does not exist, it is not necessary to prepare a pair of keys in Step 501, and the procedure can go directly to Step 502.

In Step 502, a method for obtaining an electronic certificate is selected. The electronic certificate is associated with the public key from the pair of keys that has been generated in Step 501, or to the existing public keys.

A selection is made whether an electronic certificate is to be obtained from the certificate authority (for example, http://companyupdate.microsoft.com/company/redirect/10/outldigid.asp?/helplcid=1041), or the information processing management department of the organization to which the user belongs, or prepared by executing the program for security within PC 200.

When the selection to obtain an electronic certificate from the certificate authority is made, the program for security navigates to the certificate authority (Step 504). In PC 200, for example, a browser is started up, and the site of the certificate authority is accessed by using the URL of the certificate authority. When an electronic certificate is obtained from the certificate authority, the flow of obtaining or preparing an electronic certificate is completed.

In the same manner, when the selection to acquire an electronic certificate from the information processing management department of the organization to which the user belongs is made, the program for security navigates to the information processing management department (Step 505). In PC 200, for example, a browser is started up, and the site of the information processing management department is accessed on the intranet. When an electronic certificate is obtained from the information processing management department, the flow of obtaining or preparing an electronic certificate is completed.

When the selection to prepare an electronic certificate by executing the program for security within PC 200 is made, the procedure goes to Step 503.

In Step 503, an electronic certificate is prepared by executing the program for security within PC 200. An electronic certificate in the format that is standardized by, for example, X.509, is prepared and stored in hard disk 210, and then, the flow of obtaining or preparing an electronic certificate is completed.

It is desirable for Steps 401, 402 (FIG. 4) and 501 to 505 to be carried out after program 202 for processing an electronic business card has been installed in hard disk 210 of PC 200.

(Reception of Electronic Business Card)

Figure 6:
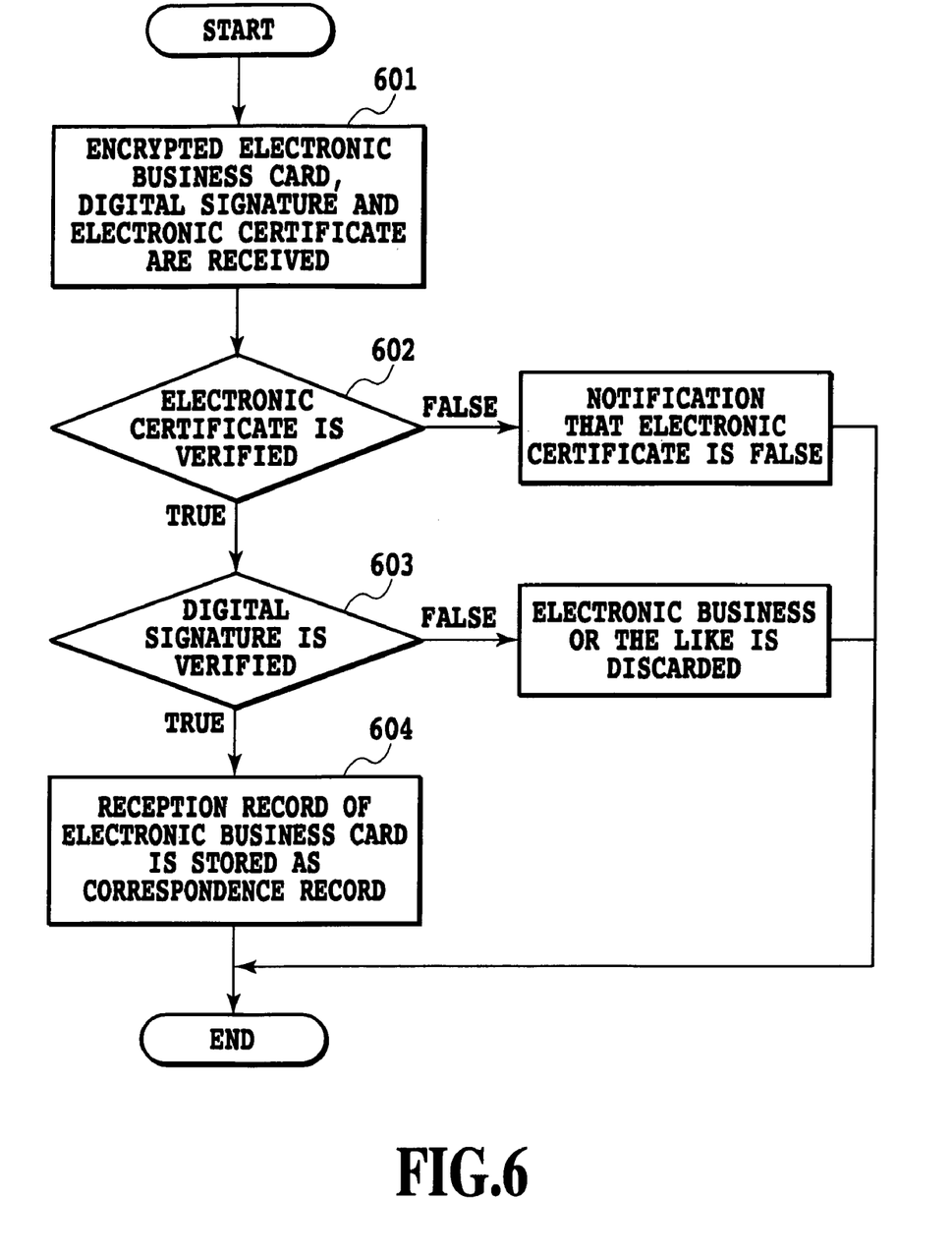
FIG. 6 is a flowchart showing the procedure of reception processing of an electronic business card.

Next, the flow of receiving an electronic business card and subsequently transmitting other data to the user of the received electronic business card is described in reference to FIG. 6.

In Step 601, program 204 for communications allows the encrypted electronic business card, the prepared digital signature and the electronic certificate to be received.

In Step 602, the program for security is executed, and the electronic certificate is verified. When the electronic certificate is interpolated, the user is notified that the electronic certificate is interpolated via an output device, such as display 223. When the electronic certificate is genuine, the procedure goes to Step 603.

In Step 603, the program for security is executed, and the digital signature is verified. The program for security is executed and the encrypted electronic business card is decoded, and thus, the digital signature is verified. A message digest of the decoded electronic business card is prepared by using the "SHA-1 algorithm, and furthermore, the digital signature prepared" by encrypting the prepared message digest with the public key that has been extracted from the electronic certificate is compared with the received digital signature. When the results of the comparison show that they match, the digital signature is genuine, and the electronic business card that has been transmitted by the transmitter is identified. When the digital signature is interpolated, the received electronic business card, the prepared digital signature and the electronic certificate are discarded. When the digital signature is genuine, the procedure goes to Step 604.

In Step 604, the program for processing an electronic business card is executed, and whereby, the communications record of the reception of the electronic business card is stored in database 203 so as to be managed as the correspondence record. That is to say, the electronic mail address of the transmitter of the electronic business card (in the case where the electronic card is received), the time of the transmission or reception thereof and the received public key are managed. In addition, the electronic business card information that has been obtained from the received electronic business card, that is to say, address list information such as name, address, telephone number and the like, is stored in the address list.

(Encryption Communications)

Figure 7:
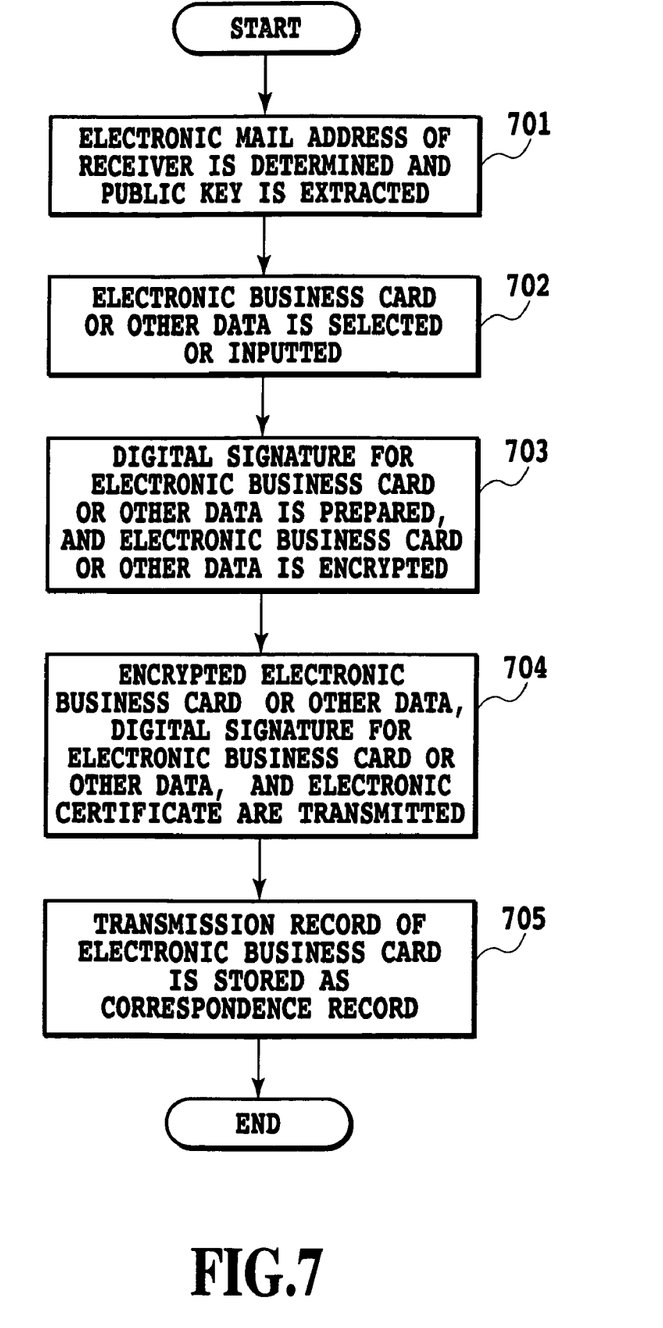
FIG. 7 is a flowchart showing the procedure of transmission processing for transmitting an electronic business card or other data by electronic mail to the transmitter of the received electronic business card.

Next, the flow of processing data transmission where an electronic business card or other data is transmitted by electronic mail to the transmitter of the received electronic business card is described in reference to FIG. 7.

In Step 701, the address list or the communications record within database 203 is used to determine the electronic mail address of the receiver. At the same time, the public key that corresponds to the electronic mail address is extracted.

In Step 702, the electronic business card or other data to be transmitted is selected or inputted.

In Step 703, the program for security is executed as described in Step 405, and a digital signature for the electronic business card or other data is prepared by using the secret key of the transmitter. In addition, the electronic business card or other data is encrypted by using the public key of the receiver. The electronic business card or other data that has been encrypted with the public key of the receiver can be decoded only with the corresponding secret key, and cannot be decoded by a third party that is not the intended receiver. The electronic business card may be encrypted by using the secret key of the transmitter, as described in Step 406.

In Step 704, the program for communications is executed, and the prepared digital signature, the encrypted electronic business card or other data, and the electronic certificate of the transmitter are transmitted in the S-MIME data format.

In Step 705, the program for processing an electronic business card stores the transmission record of the electronic business card as the correspondence record in database 203, in the same manner as in Step 408.

Here, the electronic business card or other data that has been encrypted with the public key of the receiver and has been transmitted is decoded with the corresponding secret key, by following the process flow of FIG. 7.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A method for exchanging electronic business cards between a terminal and an external device connected via a communications network, the method comprising:

storing a first pair of keys that consist of a first public key and a first secret key;

storing a first electronic certificate that includes the first public key and components of an electronic business card;

preparing, by the terminal, a first electronic business card that includes an attached digital signature using the components of the electronic business card and personal information stored within a personal information data store;

retrieving, by the terminal, personal information from the personal information data store after receiving an instruction to transmit the first electronic business card;

selecting a business card image that is stored apart from the personal information to create the first electronic business card; wherein the selected business card image is also used to create other business cards;

generating the attached digital signature using personal information, and data within the body of the first electronic business card, and the first secret key after receiving the instruction to transmit the first electronic business card;

converting the personal information to a personal information image;

displaying the selected business card image and the personal information image on a display of the terminal;

receiving a designation of a position on the display of the personal information image;

creating the first business card by combining the selected business card image with the personal information that is placed on the business card image in response to the designation of the position;

displaying the first business card on the display;

storing the first business card;

searching for the first electronic certificate;

determining, by the terminal, a receiver to receive the first electronic business card; wherein determining the receiver includes obtaining an email address and a public key of the receiver;

encrypting the first electronic business card using the public key of the receiver;

transmitting the encrypted first electronic business card that includes the attached digital signature and the first electronic certificate;

creating a correspondence record that includes a time and date of the transmission of the encrypted first electronic business card, an email address of the sender, and the email address of the receiver;

storing the correspondence record;

determining the security level of the first electronic certificate;

proposing one or more methods for obtaining a new electronic certificate when the security level of the first electronic certificate does not satisfy a predetermined security level;

receiving, from the external device, data and other electronic business cards encrypted using the first public key; and decrypting the encrypted data and other electronic business cards that have been received using the first secret key.

2. The method of claim 1, further comprising:
receiving a second electronic business card that includes an attached second digital signature, together with a second electronic certificate that includes a second public key.

3. The method of claim 2, further comprising:
verifying the second electronic certificate; and
verifying the attached second digital signature.

4. The method of claim 3, further comprising:
creating a second correspondence record that includes time and date of the reception of the second electronic business card, the email address of the sender, the email address of the receiver; and
storing the second correspondence record.

5. The method of claim 4, wherein the second correspondence record further comprises name of the sender and name of the receiver.

6. The method of claim 2, further comprising:
encrypting data using the second public key that is included in the second electronic certificate; and
transmitting the encrypted data.

7. The method of claim 1, further comprising selecting the one or more methods that has been proposed, and preparing a new electronic certificate.

8. A computer readable storage medium, which is not a signal, storing computer executable instructions that, when executed by a processor, cause the processor to perform operations for exchanging electronic business cards between a terminal and an external device connected via a communications network, the operations comprising:

storing a first pair of keys that consist of a first public key and a first secret key;

storing a first electronic certificate that includes the first public key and components of an electronic business card;

preparing, by the terminal, a first electronic business card that includes an attached digital signature using the components of the electronic business card and personal information stored within a personal information data store;

retrieving, by the terminal, personal information from the personal information data store after receiving an instruction to transmit the first electronic business card;

selecting a business card image that is stored apart from the personal information to create the first electronic business card; wherein the selected business card image is also used to create other business cards;

generating the attached digital signature using personal information, and data within the body of the first electronic business card, and the first secret key after receiving the instruction to transmit the first electronic business card;

converting the personal information to a personal information image;

displaying the selected business card image and the personal information image on a display of the terminal;

receiving a designation of a position on the display of the personal information image;

creating the first business card by combining the selected business card image with the personal information that is placed on the business card image in response to the designation of the position;

displaying the first business card on the display;

storing the first business card;

searching for the first electronic certificate;

determining, by the terminal, a receiver to receive the first electronic business card; wherein determining the receiver includes obtaining an email address and a public key of the receiver;

encrypting the first electronic business card using the public key of the receiver;

transmitting the encrypted first electronic business card that includes the attached digital signature and the first electronic certificate;

creating a correspondence record that includes a time and date of the transmission of the encrypted first electronic business card, an email address of the sender, and the email address of the receiver;

storing the correspondence record;

determining the security level of the first electronic certificate;

proposing one or more methods for obtaining a new electronic certificate when the security level of the first electronic certificate does not satisfy a predetermined security level;

receiving, from the external device, data and other electronic business cards encrypted using the first public key; and decrypting the encrypted data and other electronic business cards that have been received using the first secret key.

9. The computer readable storage medium of claim 8, further comprising computer executable instructions for:

receiving a second electronic business card that includes an attached second digital signature, together with a second electronic certificate that includes a second public key.

10. The computer readable storage medium of claim 9, further comprising computer executable instructions for:

verifying the second electronic certificate; and verifying the attached second digital signature.

11. The computer readable storage medium of claim 10, further comprising computer executable instructions for:

creating a second correspondence record that includes time and date of the reception of the second electronic business card, the email address of the sender, the email address of the receiver; and storing the second correspondence record.

12. The computer readable storage medium of claim 11, wherein the second correspondence record further comprises name of the sender and name of the receiver.

13. The computer readable storage medium of claim 9, further computer executable instructions for comprising:

encrypting data using the second public key that is included in the second electronic certificate; and transmitting the encrypted data.

14. The computer readable storage medium of claim 8, further comprising computer executable instructions for selecting the one or more methods that has been proposed, and preparing a new electronic certificate.

15. A terminal for exchanging electronic business cards with an external device connected via a communications network, said terminal comprising:

a processor; and a memory storing computer executable instructions that, when executed by the processor, cause the processor to perform operations, comprising:

storing a first pair of keys that consist of a first public key and a first secret key;

storing a first electronic certificate that includes the first public key and components of an electronic business card;

preparing, by the terminal, a first electronic business card that includes an attached digital signature using the components of the electronic business card and personal information stored within a personal information data store;

retrieving, by the terminal, personal information from the personal information data store after receiving an instruction to transmit the first electronic business card;

selecting a business card image that is stored apart from the personal information to create the first electronic business card; wherein the selected business card image is also used to create other business cards;

generating the attached digital signature using personal information, and data within the body of the first electronic business card, and the first secret key after receiving the instruction to transmit the first electronic business card;

converting the personal information to a personal information image;

displaying the selected business card image and the personal information image on a display of the terminal;

receiving a designation of a position on the display of the personal information image;

creating the first business card by combining the selected business card image with the personal information that is placed on the business card image in response to the designation of the position;

displaying the first business card on the display;

storing the first business card;

searching for the first electronic certificate;

determining, by the terminal, a receiver to receive the first electronic business card; wherein determining the receiver includes obtaining an email address and a public key of the receiver;

encrypting the first electronic business card using the public key of the receiver;

transmitting the encrypted first electronic business card that includes the attached digital signature and the first electronic certificate;

creating a correspondence record that includes a time and date of the transmission of the encrypted first electronic business card, an email address of the sender, and the email address of the;

storing the correspondence record;

determining the security level of the first electronic certificate;

proposing one or more methods for obtaining a new electronic certificate when the security level of the first electronic certificate does not satisfy a predetermined security level;

receiving, from the external device, data and other electronic business cards encrypted using the first public key; and decrypting the encrypted data and other electronic business cards that have been received using the first secret key.

16. The terminal of claim 15, further computer executable instructions for comprising:

receiving a second electronic business card that includes an attached second digital signature, together with a second electronic certificate that includes a second public key.

17. The terminal of claim 16, further computer executable instructions for comprising:

verifying the second electronic certificate; and verifying the attached second digital signature.

18. The terminal of claim 17, further computer executable instructions for comprising:

creating a second correspondence record that includes time and date of the reception of the second electronic business card, the email address of the sender, the email address of the receiver; and storing the second correspondence record.

19. The terminal of claim 18, wherein the second correspondence record further comprises name of the sender and name of the receiver.

20. The terminal of claim 16, further computer executable instructions for comprising:

encrypting data using the second public key that is included in the second electronic certificate; and transmitting the encrypted data.

* * * * *